United States Patent [19]

Takahashi

[11] Patent Number: 5,893,577
[45] Date of Patent: Apr. 13, 1999

[54] COLLAPSIBLE SEAT DEVICE

[75] Inventor: Hayato Takahashi, Saitama, Japan

[73] Assignee: Combi Corporation, Tokyo, Japan

[21] Appl. No.: 08/824,461

[22] Filed: Mar. 26, 1997

[30] Foreign Application Priority Data

Aug. 12, 1996 [JP] Japan ................................. 8-212249

[51] Int. Cl.$^6$ ................................................. B62B 7/06
[52] U.S. Cl. ................................................. 280/642
[58] Field of Search ........................... 280/38, 641, 642, 280/644, 650, 655, 657, 658, 47.34, 47.35, 47.38, 47.41

[56] References Cited

U.S. PATENT DOCUMENTS

| | | | |
|---|---|---|---|
| 5,087,066 | 2/1992 | Mong-Hsing | 280/644 |
| 5,472,224 | 12/1995 | Cabagnero | 280/642 |
| 5,490,685 | 2/1996 | Kitayama et al. | 280/47.38 |
| 5,622,376 | 4/1997 | Shamie | 280/642 |
| 5,741,021 | 4/1998 | Saint et al. | 280/47.38 |
| 5,775,718 | 7/1998 | Huang | 280/642 |

*Primary Examiner*—Charles T. Jordan
*Assistant Examiner*—Charles R. Ducker, Jr.
*Attorney, Agent, or Firm*—Sughrue, Mion, Zinn, Macpeak & Seas, PLLC

[57] ABSTRACT

A collapsible seat device having a framework that allows the seat to be easily developed and collapsed, having an upper end portion of the front leg 13 connected with a front portion of the armrest member 21 by means of the hinge 23, and an upper end portion of the rear leg 25 connected with a center with respect to the longitudinal direction of the armrest member 21 by means of a hinge. A push rod 9 is connected with a rear portion of the armrest member 21 by means of the hinge 27. A lower end portion of the push rod 9 is connected with an upper end portion of the rotary member 29 by means of the hinge 31. A lower end portion of the rotary member 29 is connected with the rear leg 25 by means of the hinge 33. The other end portion of the connecting member 35 connected with the front leg 13 by means of the hinge 37 is connected with a substantial center of the rotary member 29 by means of the hinge 39. This configuration allows the collapsible seat device to be made compact after it has been collapsed.

7 Claims, 13 Drawing Sheets

COLLAPSIBLE SEAT DEVICE

BACKGROUND OF THE INVENTION

1. Field of the Invention

The present invention relates to a collapsible seat device by which a framework composing a seat device such as a baby buggy, a wheelchair and a buggy of the aged can be easily developed and collapsed.

2. Related Art

Figure 13A:
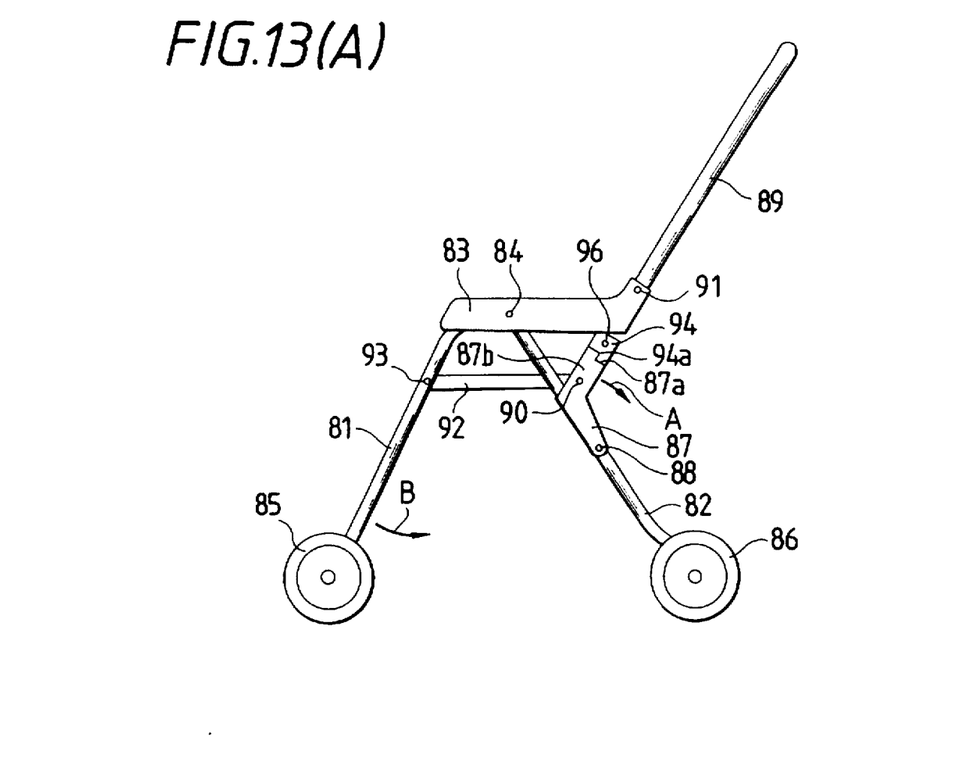
FIG. 13(A) is a view showing a developing condition.
Figure 13B:
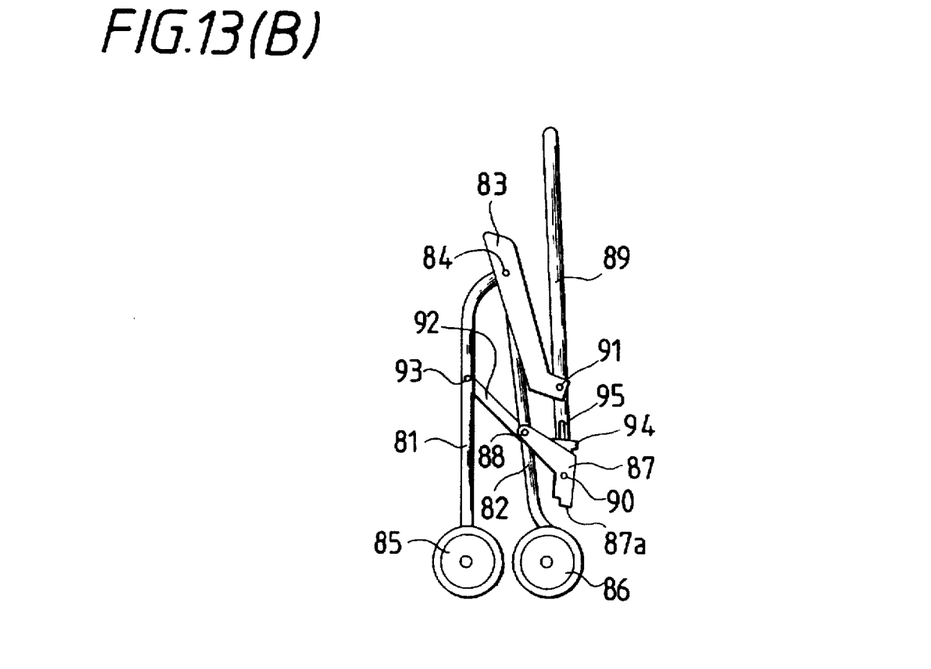
FIG. 13(B) is a view showing a collapsing condition.

FIG. 13 is an overall arrangement view of a collapsible baby buggy which is one of the conventional collapsible seat devices In FIG. 13, there are provided a front leg 81 and a rear leg 82, both upper end portions of which are rotatably connected with an armrest member 83 by means of a hinge 84. At a lower end portion of the front leg 81, there is provided a front wheel 85. At a lower end portion of the rear leg 82, there is provided a rear wheel 86.

At a substantial center of the rear leg 82 with respect to the longitudinal direction, there is provided a rotary member 87, which is rotatably connected with the rear leg 82 by means of a hinge 88. This rotary member 87 is extended upward from the hinge 88 along the rear leg 82. Further, this rotary member 87 is curved in such a manner that it protrudes upward to the rear portion of the rear leg 82. A push rod 89 is rotatably connected with a protruding portion 87b of the rotary member 87 by means of a hinge 90.

This push rod 89 is rotatably connected with a rear end portion of the armrest member 83 by means of a hinge 91. Therefore, the rotation of the push rod 89 is restricted under the condition that the front leg 81 and the rear leg 82 are open.

A front end portion of the connecting member 92 is rotatably connected with a middle portion of the front leg 81 by means of a hinge 93. A rear end portion of the connecting member 92 is rotatably connected with the rotary member 87 by means of the hinge 90 described before. Accordingly, an angle formed between the front leg 81 and the rear leg 82 is restricted to be a predetermined value.

In an upper portion of the protruding portion 87b of the rotary member 87, there is provided an opening and closing lock 94 which is moved upward and downward along the push rod 89. When a step portion 94a formed at the lower end of this opening and closing lock 94 is engaged with a step portion 87a formed at the upper end of the rotary member 87, the rotary member 87 can be put into a lock condition.

However, the following problems may be encountered in the conventional collapsible baby buggy described above. When the conventional baby buggy is collapsed as shown in FIG. 13(B), it is difficult for the baby buggy to be made into a compact condition. Although not shown in FIG. 13, in order to perform various functions, most of baby buggies are equipped with a reclining seat back portion and a sunshade. Therefore, it is difficult to make the baby buggies put in a compact condition when they are collapsed. Especially when the baby buggy has a shopping basket or a baby basket which is detachably attached to it, the baby buggy tends to be bulky even after it has been collapsed. In view of the above circumstances, there is a demand for a framework by which the baby buggy can be made compact after it has been collapsed.

Not only a collapsible baby buggy but also other seat devices such as a wheelchair, an infant chair and a buggy of the aged are required to be compact after they have been collapsed.

SUMMARY OF THE INVENTION

The present invention has been accomplished to solve the above problems. An object of the present invention is to provide a collapsible seat device which can be made compact after it has been collapsed.

In order to accomplish the above object, according to the present invention, there is provided a collapsible seat device comprising a frame, said frame including an armrest member; a front leg, the upper end of which is connected with a front portion of the armrest member by means of a hinge; a rear leg, the upper end of which is connected with a center of the armrest member with respect to the longitudinal direction or connected with a front portion of the armrest member by means of a hinge; a push rod, the center of which with respect to the upward and downward direction is connected with a rear portion of the armrest member by means of a hinge; a rotary member, the upper end of which is connected with a lower end of the push rod by means of a hinge, and the lower end of which is connected with the rear leg by means of a hinge; and a connecting member, one end of which is connected with the rotary member by means of a hinge, and the other end of which is connected with the front leg by means of a hinge, wherein the collapsible seat device is collapsed when the rotary member is turned and located at a lower position, the collapsible seat device is developed when the rotary member is turned and located at an upper position, and one end of the connecting member is connected by means of a hinge with an approximately center portion defined between both hinge connecting portions of the rotary member.

According to the present invention, the middle of the rotary member is a substantial center of the rotary member.

According to the present invention, the connecting member is extended backward from a portion in which the connecting member is connected with the rotary member by means of a hinge, the extending length of the connecting member is determined so that the seat device can stand alone when a rear end portion of the connecting member comes into contact with the ground in a collapsed state, and a wheel of the rear leg and a wheel of the front leg are located in the upward and downward direction when the seat device is collapsed.

According to the present invention, there is provided a collapsible seat device comprising a first frame including a front leg and a rear leg, both upper end portions of which are connected with an armrest member by means of a hinge, wherein the seat device is collapsed when an angle formed between the front leg and the rear one is decreased, and the seat device is developed when the angle formed between the front leg and the rear one is increased, said collapsible seat device further comprising a second frame attached to the first frame, a baby basket is detachably fixed to the second frame, and the second frame is folded so that the baby basket can be moved in the direction of the front leg when the seat device is collapsed to decrease height of whole device in the collapsed state.

According to the present invention, there is provided, the second frame comprising: a first member curved downward, one end portion of which is connected with the rear leg by means of a hinge; a second member, one end of which is connected with the other end of the first member by means of a hinge, and the other end of which is connected with the front leg by means of a hinge; and a fixing means for detachably fixing the baby basket attached to the first member.

According to the present invention, there is provided a collapsible seat device in which a relative positional relation between the push rod and the rear leg when the seat device is collapsed is different from a relative positional relation between the push rod and the rear leg when the seat device is developed, and the collapsible seat device comprises: a seat back portions the lower end portion of which is rotatably connected with the rear leg by means of a hinge; a cylindrical tongue-shaped member arranged on a side of the seat back portion, the tongue-shaped member engaging with a columnar portion of the pipe composing the push rod so that the tongue-shaped member can slide when the seat device is collapsed; a cutout groove formed diagonally in the tongue-shaped member; and a protrusion engaging with the cutout groove formed in the columnar portion of the pipe composing the push rod, the protrusion pushing a side at the rear of the cutout groove.

BRIEF DESCRIPTION OF THE DRAWINGS

FIGS. 3(A)–3(B) are perspective view showing a collapsing condition in which the baby basket shown in FIG. 1 is collapsed;

FIGS. 12(A)–12(C) are views showing a mechanism by which a frame of the seat back portion shown in FIG. 11 is automatically removed backward in the collapsing operation; FIG. 12(A) is a perspective view of.

FIGS. 13(A)–13(B) are side views showing an example of the conventional collapsing type baby buggy.

DETAILED DESCRIPTION OF THE PREFERRED EMBODIMENTS

First embodiment

Referring to FIGS. 1 to 12, a first embodiment of the present invention will be explained below.

OVERALL ARRANGEMENT

The collapsible seat device relating to First embodiment is a collapsible baby buggy.

Figure 1:
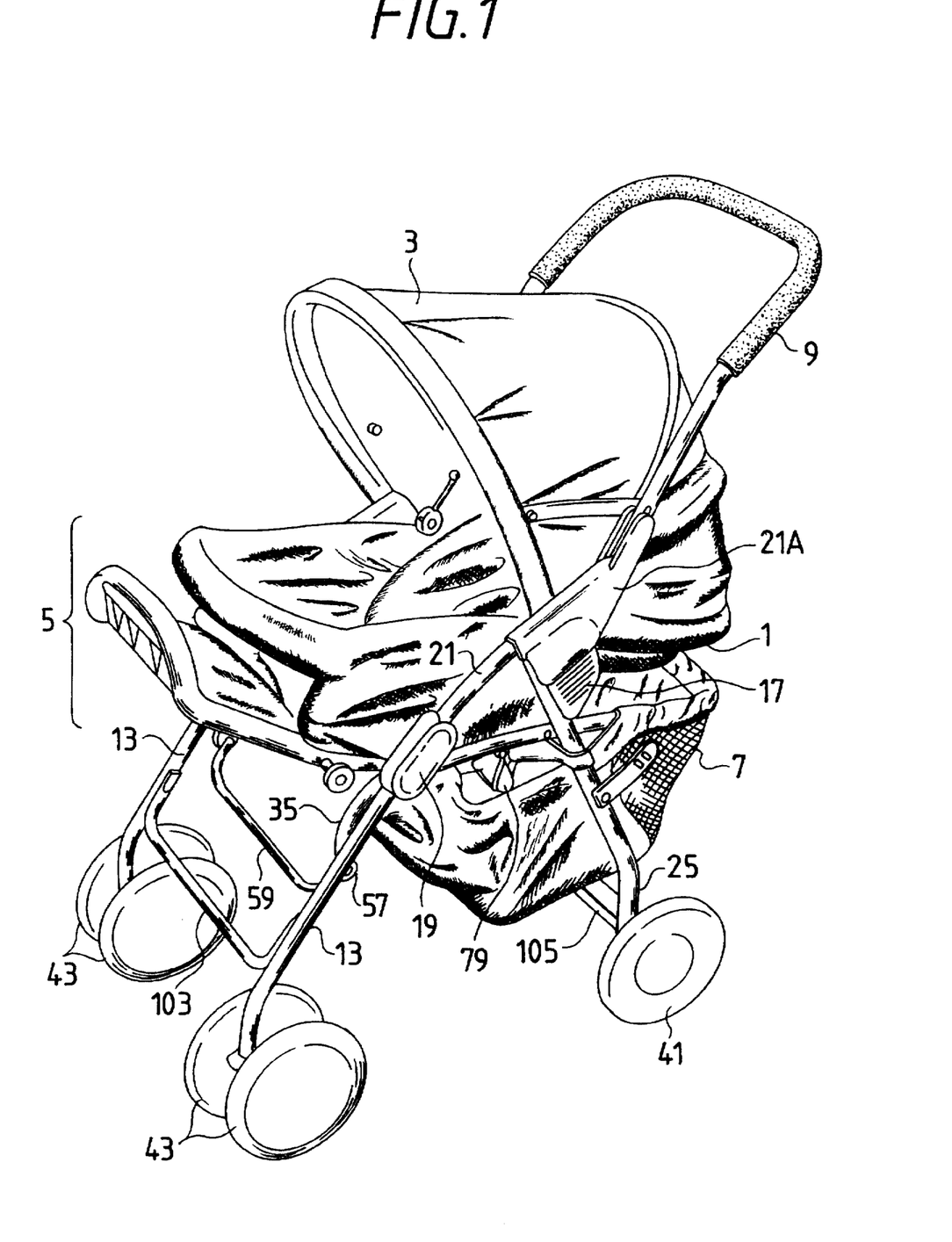
FIG. 1 is an overall perspective view showing a collapsible baby buggy which is first embodiment of the present invention.
Figure 2:
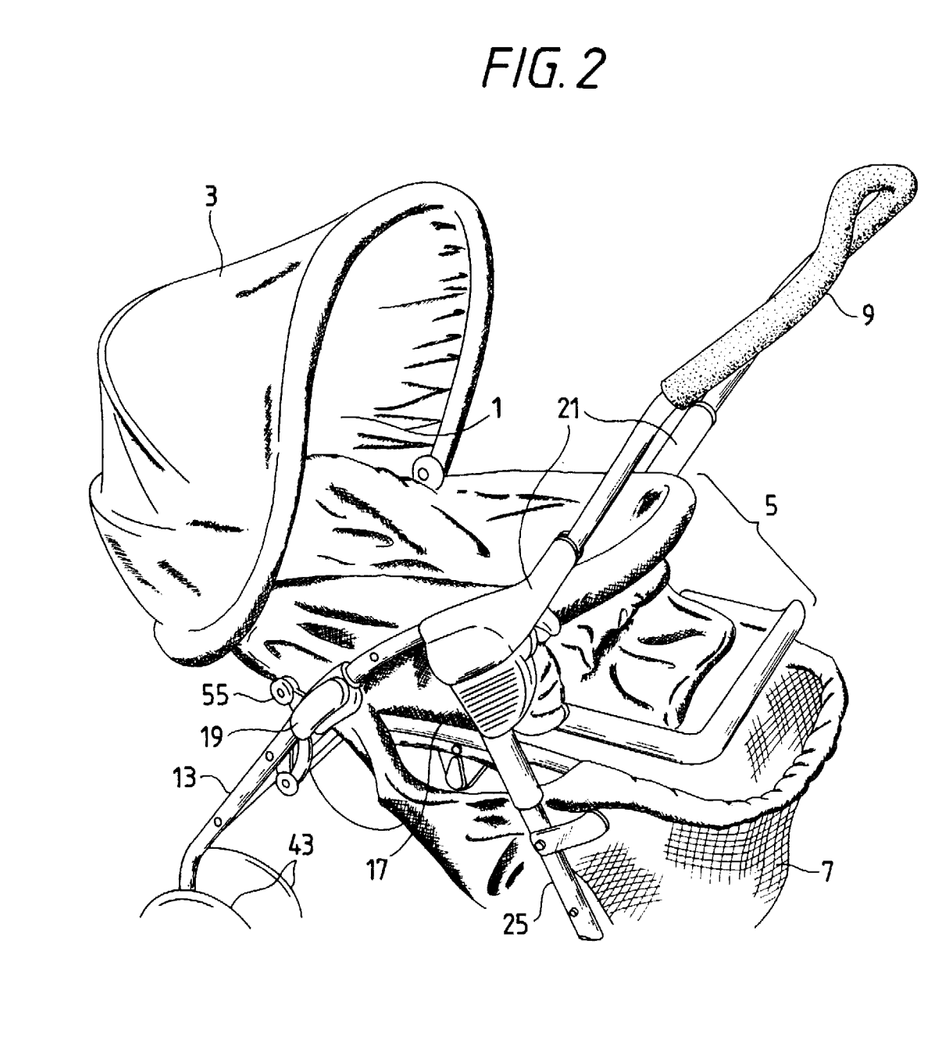
FIG. 2 is a perspective view of a baby buggy, a baby basket of which is arranged so that mother can face it.
Figure 4:
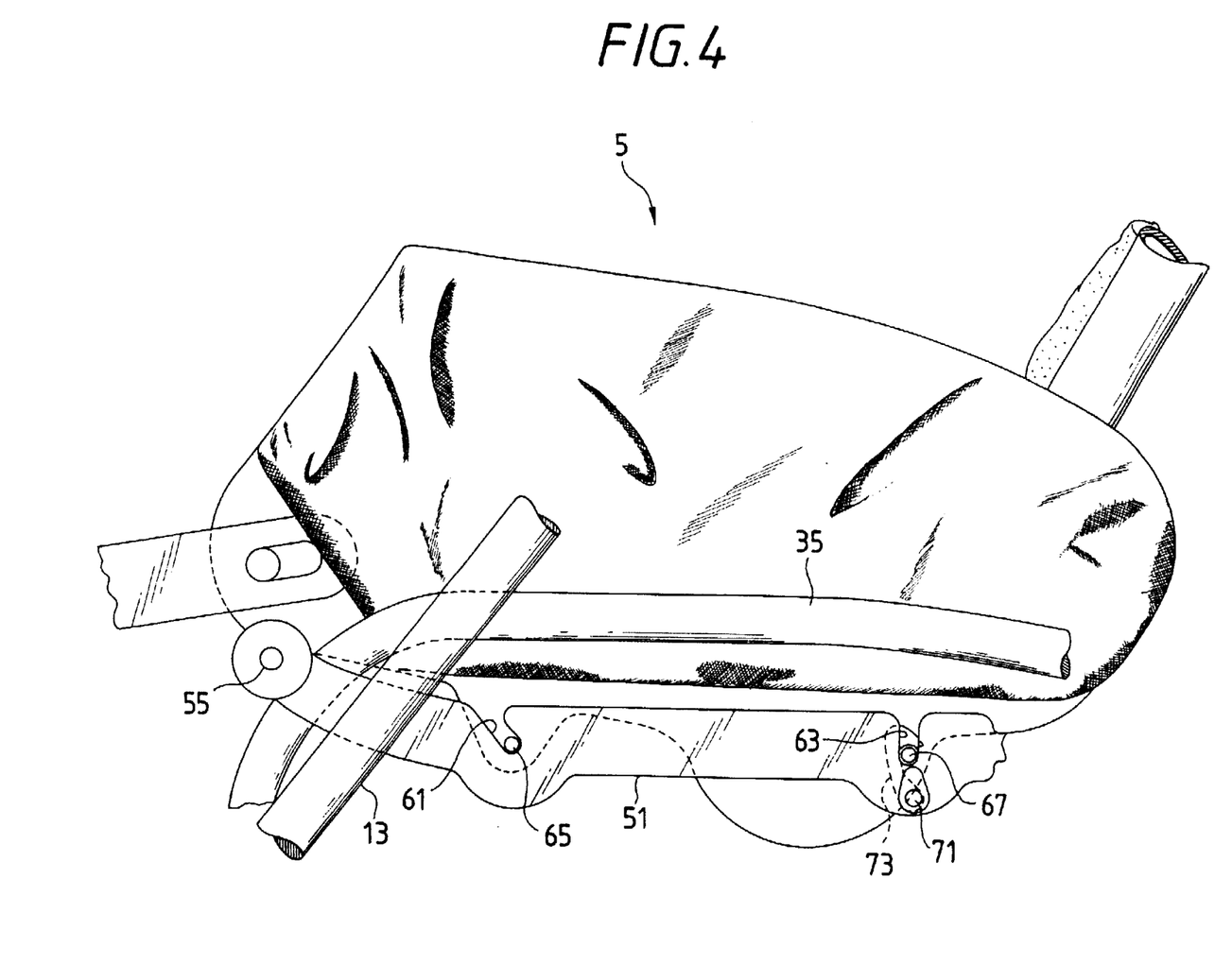
FIG. 4 is a side view showing a primary portion of the structure by which the baby basket is detachably fixed.
Figure 5:
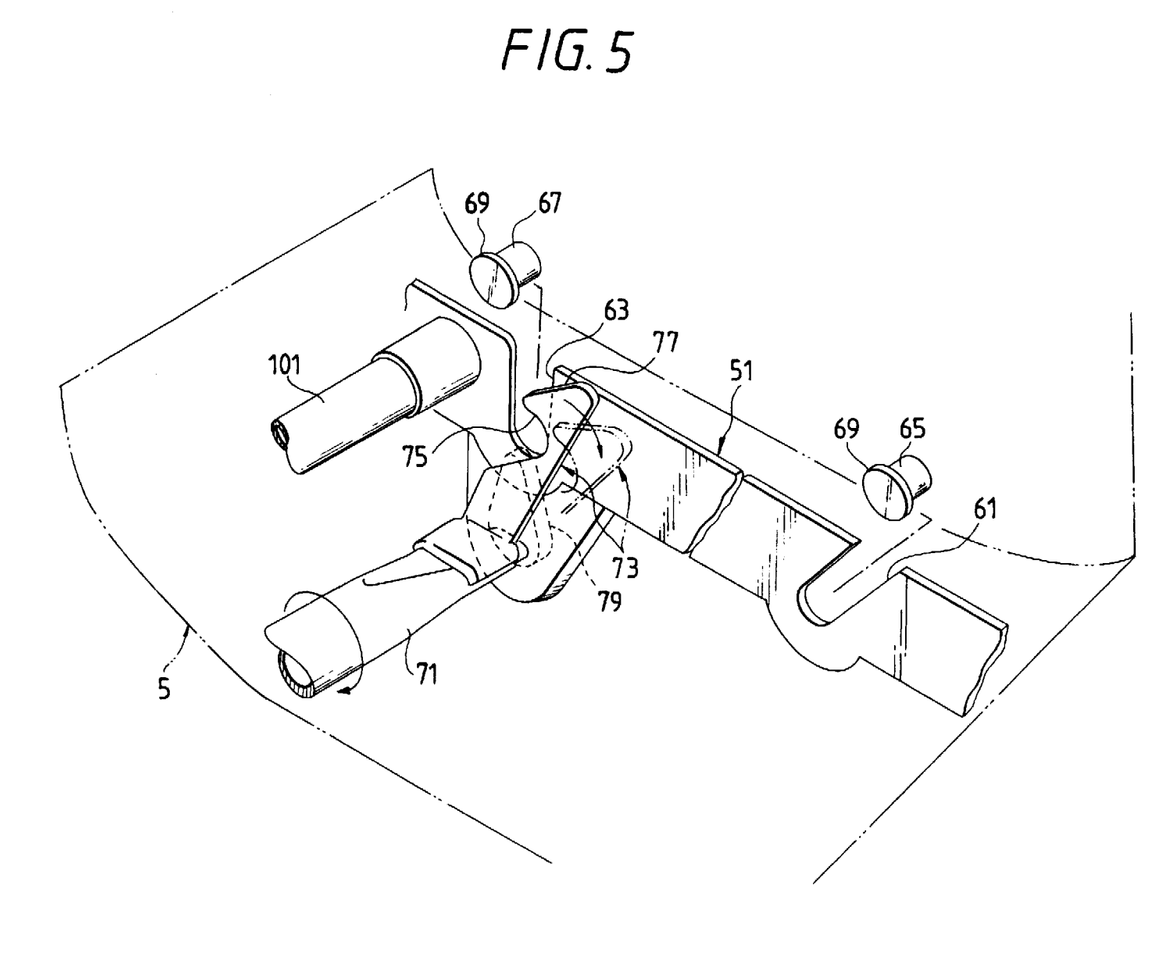
FIG. 5 is a partially enlarged perspective view showing a lock means for fixing the baby basket shown in FIG. 4.

FIG. 1 is an overall perspective view showing a state in which the collapsible baby buggy of this embodiment is developed. A baby basket, which has a reclining seat back portion 1 and a sunshade 3, is detachably attached to the frame work as illustrated in FIGS. 4 and 5. In a lower portion of the framework at the rear of the baby basket 5, there is provided a shopping basket 7. In FIG. 1, the baby basket 5 faces the front, however, it is possible to change the direction of the baby basket 5. In FIG. 2, the direction of the baby basket 5 shown in FIG. 1 is changed, so that mother who pushes the push rod 9 can face the baby basket 5.

Figure 3A:
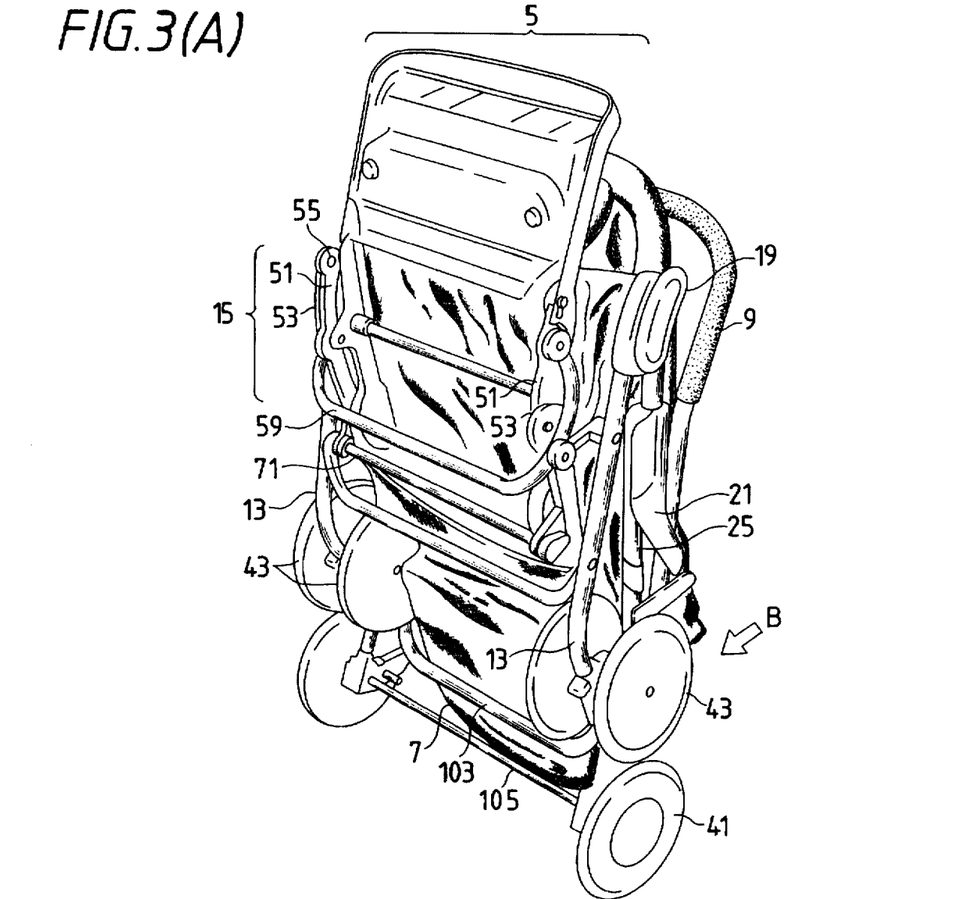
FIG. 3(A) is a perspective view showing a collapsing condition, wherein the view is taken in the direction of a front leg.
Figure 3B:
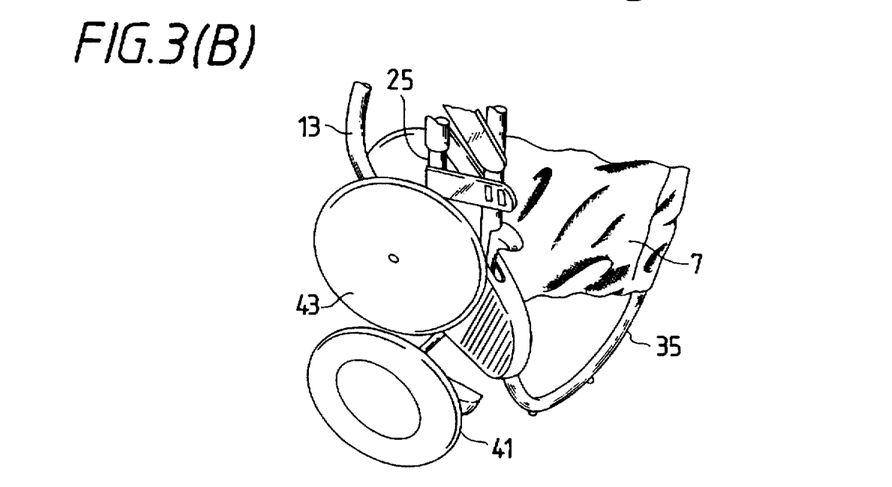
FIG. 3(B) is a perspective view showing a portion of FIG. 3(A), wherein the view is taken in the direction of a rear leg.
Figure 6:
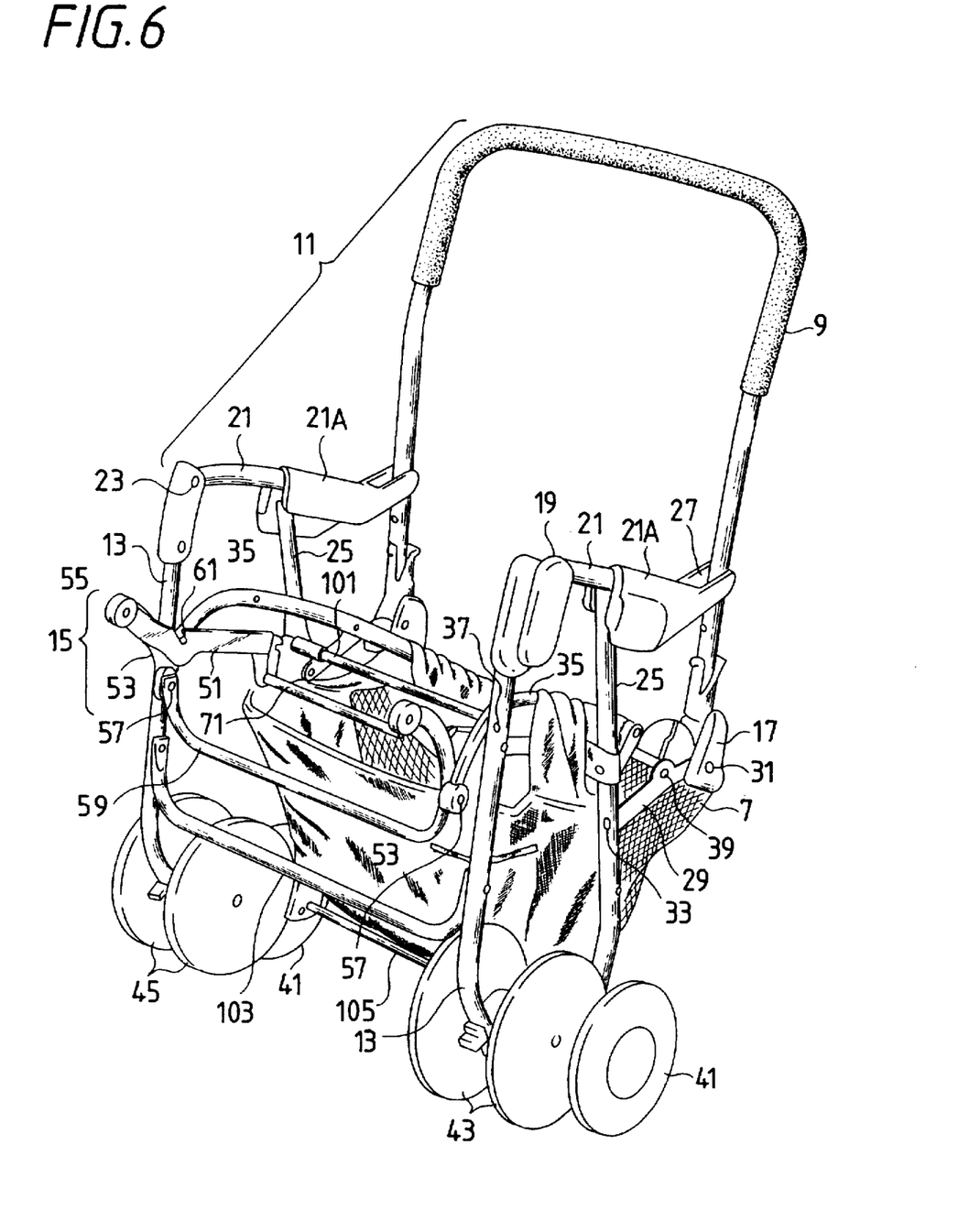
FIG. 6 is a perspective view of a collapsing type baby buggy in the collapsing process after the baby basket has been detached in FIG. 3.
Figure 7:
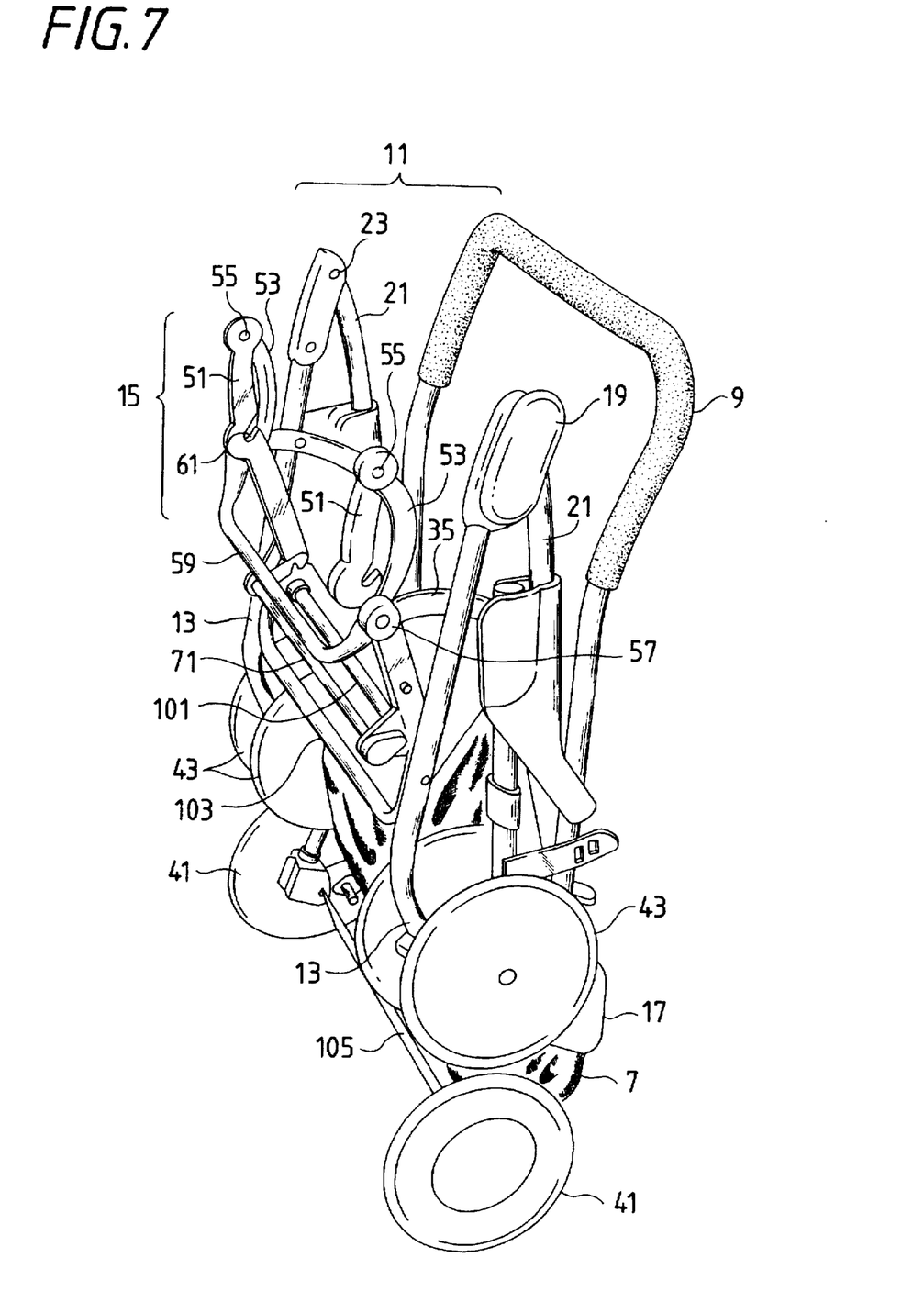
FIG. 7 is a perspective view showing a collapsible type baby buggy which has been collapsed in FIG. 6.

FIG. 3 is a perspective view showing a collapsing state in which the baby buggy is collapsed while the baby basket 5 is attached to the frame work. FIG. 6 is a perspective view showing a state in which the baby basket 5 is detached from the framework and the baby buggy is in the middle of a collapsing motion. FIG. 7 is a view showing a state in which the baby basket 5 is detached from the framework and the baby buggy is collapsed. As illustrated in FIGS. 6 and 7, the baby buggy includes a first frame 11 which is a main frame to compactly collapse the baby buggy; and a second frame 15 to which the baby basket 5 is detachably attached, wherein the second frame 15 is moved in a direction of the front leg 13 being interlocked with a collapsing motion of the first frame 11.

Figure 8:
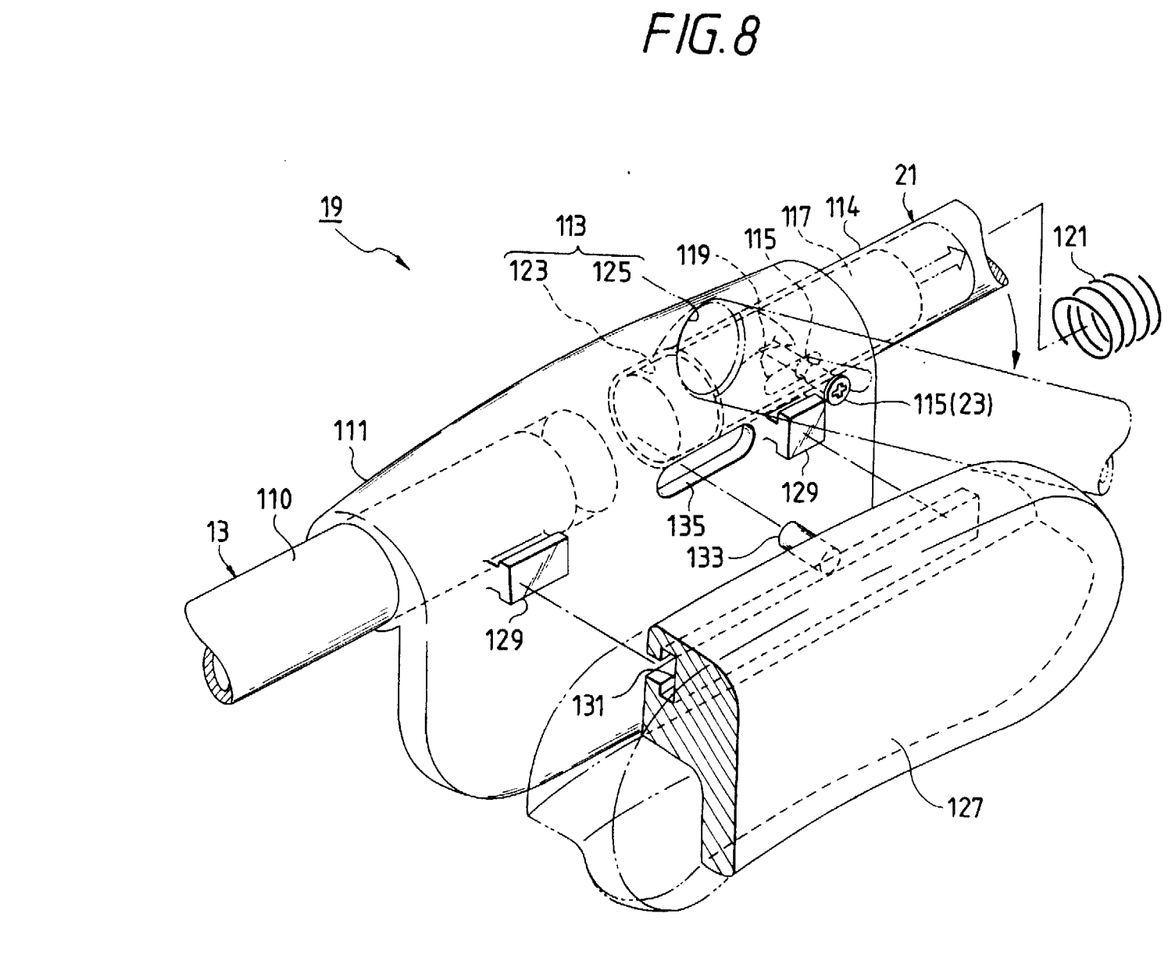
FIG. 8 is a perspective view showing a slide type lock mechanism used as the second lock mechanism when the overall framework shown in FIG. 1 is developed.
Figure 9:
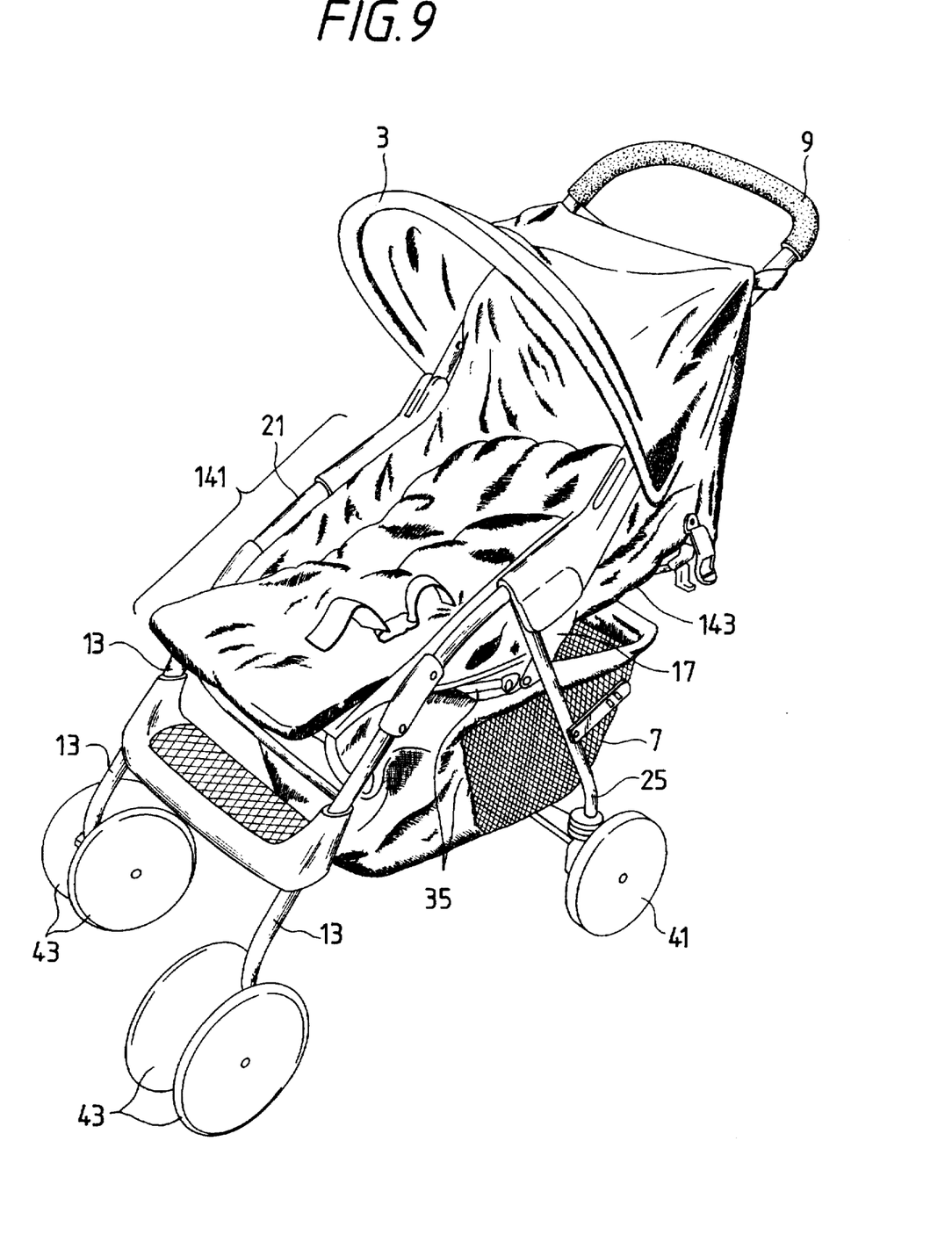
FIG. 9 is an overall perspective view showing second embodiment of the present invention.
Figure 10:
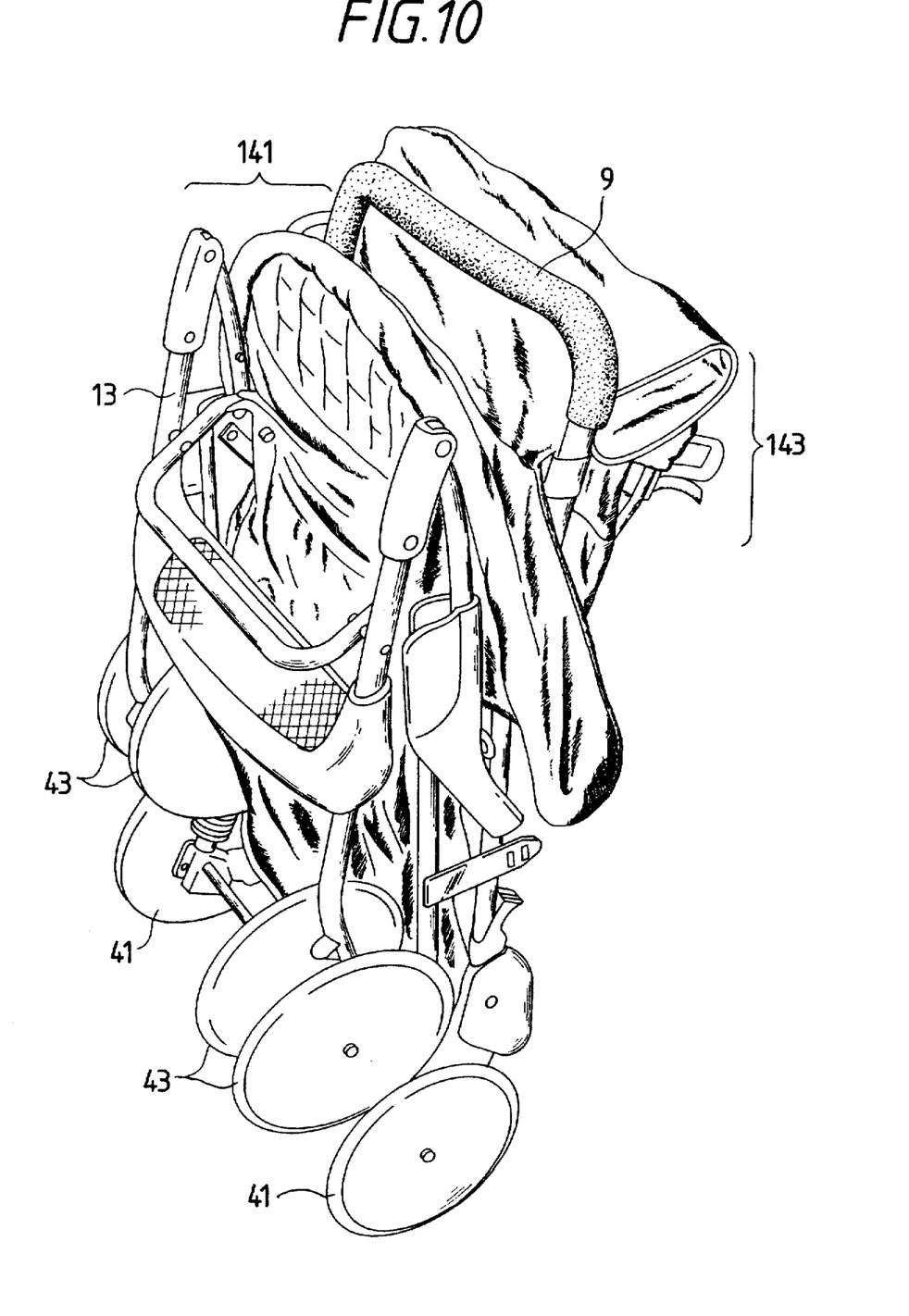
FIG. 10 is a perspective view showing a collapsing condition of the baby buggy shown in FIG. 9.

In order to prevent the framework from collapsing unexpectedly, the same lock mechanism 17 (the first lock mechanism) as that of the conventional collapsible baby buggy is provided in the first frame 11. Not only the first lock mechanism but also the second lock mechanism composed of a slide type lock mechanism 19 is provided as shown in FIGS. 1 and 8.

FIRST FRAME

Next, referring to FIGS. 1, 2, 3, 6 and 7, the first frame 11, which is a main frame of the collapsible baby buggy of Embodiment 1, will be explained as follows.

The armrest member 21 of this embodiment is greatly inclined downward in the front direction. When the baby buggy is developed as shown in FIGS. 1 and 2, the armrest member 21 continues to a portion of the front leg 13, so that the armrest member 21 and the portion of the front leg 13 form a continuous curve. An upper end of the front leg 13 is connected with the front portion of the armrest member 21 by means of a hinge 23. An upper end of the rear leg 25 is connected with a middle portion of the armrest member 21 by means of a hinge not shown in the drawing. In this connection, the upper end of the rear leg 25 may be connected with the front portion of the armrest member 21 by means of a hinge. A center of the push rod 9 with respect to the upward and downward direction is connected with the rear portion of the armrest 21 by means of a hinge 27. A lower end of the push rod 9 is connected with the upper end of the rotary member 29 by means of a hinge 31. A lower end of the rotary member 29 is connected with the rear leg 25 by means of a hinge 33. One end of the connecting member 35 is connected with the center of the front leg 13 with respect to the longitudinal direction by means of a hinge 37. The other end of the connecting member 35 is connected with a substantial center of the rotary member 29 by means of a hinge 39.

When the seat device is collapsed, the rotary member 29 is turned round the hinge connecting portion 33 at which the rotary member 29 is connected with the rear leg 25, so that the rotary member 29 is located at a lower position and pushes down the lower end portion of the push rod 9 in such a manner that the lower end portion of the push rod 9 is turned backward. Due to the foregoing, a rectangle formed by four hinge connecting points 27, 31, 33 and so forth is changed from a closed state (shown in FIGS. 1 and 2) to an open state (shown in FIG. 6). Then the rectangle is closed in the opposite direction (shown in FIGS. 3 and 7). In this closed state, the armrest 21, push rod 9 and rotary member 29 are arranged substantially in parallel with the rear leg 25.

At the same time, the connecting member 35 connected with the substantial center of the rotary member 29 by the hinge 39 is turned backward and pushed down. The front leg 13 is pulled by the connecting member 35 which moves backward. Therefore, the front leg 13 is turned round the hinge 23 located in the front of the armrest member 21. Accordingly, the front leg 13 comes close to the rear leg 25 and is arranged substantially in parallel with it.

As described above, the front leg 13 and the rotary member 29 come close to the rear leg 25 and are arranged substantially in parallel with the rear leg 25. Accordingly, the connecting member 35, which is connected with the front leg 13 and the rotary member 29 by the hinges 37, 39, also comes close to the rear leg 25 and is arranged substantially in parallel with the rear leg 25. As described above, a pentagon formed by five hinge connecting portions 37, 23, 27, 31, 39 is closed, and the seat device is collapsed.

In the developing motion of the seat device, the rotary member 29 is turned in the opposite direction and located at an upper position. Due to the foregoing, the seat device is developed by conducting a motion opposite to the above collapsing motion.

In this case, consideration is given to the connecting member 35. The framework of the conventional collapsible baby buggy includes a rectangle composed of four hinge connecting portions 37, 23, 27, 31 which correspond to 93, 84, 91, 90 in FIG. 13. The conventional collapsible baby buggy is collapsed and developed when the above rectangle is closed and opened., however, in this embodiment, the framework is collapsed and developed when the pentagon composed of five hinge connecting portions 37, 23, 27, 31, 39 is closed and opened.

When the number of hinge connecting portions is increased by one as described above, the entire first frame 11 is completely collapsed, so that the total height of the seat device can be reduced when it is collapsed, that is, the seat device can be made compact after it has been collapsed.

Further, when the connecting member 35 is connected with a substantial center of the rotary member 29 by means of a hinge 39, it is possible to sufficiently extend the length of the rotary member 29 at the rear portion of the hinge connection 39. Due to the foregoing, when the rotary member 29 is turned, that is, when the seat device is collapsed, the hinge connecting portion 31 in which the rotary member 29 is connected with the push rod 9 is greatly moved downward, so that the push rod 9 is greatly moved downward. Therefore, the push rod 9 can be completely collapsed and accommodated when the seat device is collapsed.

When the seat device is collapsed, a portion of the push rod 9 from the hinge 27 to the lower end is accommodated in a cover 21A which is attached to the armrest member 21 and open downward, and the shape of the cover 21A is curved along the armrest member 21. The shape of the rotary member 29 is formed in such a manner that the rotary member 29 agrees with the rear leg 25 when the seat device is collapsed. An upper portion of this rotary member 29 is accommodated in the cover 21A attached to the armrest member 21. Therefore, as compared with the conventional example shown in FIG. 13, the shape of the lower end portion of the push rod 9 and that of the upper end portion of the rear leg 25 become shapely. That is, it is possible for mother to put a hand into the lower end portion of the push rod 9 and the upper end portion of the rear leg 25 in the transverse direction. Accordingly, goods can be easily put into and taken out from the shopping basket 7.

The connecting member 35 is further extended backward from a portion of the hinge 39 by which the connecting member 35 is connected with the rotary member 29. In this extending portion, the right member and the left one are continued to each other, so that the connecting member is formed into a substantial U-shape. To this U-shaped portion of the connecting member 35, the shopping basket 7 made of cloth is attached.

Since the connecting member 35 is extended as described above, when the baby buggy is collapsed as illustrated in FIG. 3, the rear end portion of the connecting member 35 comes into contact with the ground. When the connecting member 35 comes into contact with the ground as described above, it is possible for the collapsible baby buggy of this embodiment to stand alone being supported by the connecting member 35, the rear leg 25 and the wheel 41 as illustrated in FIG. 3(B). Consequently, it is unnecessary to use the wheel 43 of the front leg 13 for the purpose of making the baby buggy stand alone. Therefore, the wheel 41 of the rear leg 25 and the wheel 43 of the front leg 13 can be arranged being aligned in the upward and downward direction. In other words, unlike the baby buggy of the prior art (FIG. 13) which is made to stand alone by arranging both wheels 41, 43 in the transverse direction in that Figure, the baby buggy of the embodiment can be made to stand alone by arranging the wheels, 41, 43 in the upward and downward direction, and the baby buggy can be collapsed in a compact state.

SECOND FRAME

When the baby buggy is collapsed, an angle formed by the front leg 13 and the rear leg 25 is decreased. When the baby buggy is developed, the angle formed by the front leg 13 and the rear leg 25 is increased. The second frame 15 is attached to the front leg 13 and the rear leg 25. This second frame 15 is used for fixing the baby basket 5. When the baby buggy is collapsed, the second frame 15 is interlocked with the first frame 11 and moved toward the front leg 13. Due to the foregoing, the overall baby buggy can be made compact when it is collapsed.

This second frame 15 is composed of a first member 51 and a second member 53. One end portion of the first member 51 is connected with the rear leg 25 by means of a hinge. The shape of the first member 51 is formed in such a manner that the first member 51 is once curved downward and then raised upward. One end portion of the second member 53 is connected with the raised end portion of the first member 51 by means of a hinge 55. Then the second member 53 is curved backward, and the other end portion of the second member 53 is connected with the front leg 13 side by means of a hinge 57. This hinge connection 57 with the front leg 13 side is conducted on an end portion of the connecting member 35 curved downward which is connected with the front leg 13 by means of a hinge 37. The other end portion of the second member 53 is extended downward and formed into a connecting portion 59 which is also used as a step.

Due to the actions of the first frame 11 and the second one 15, the second frame 15 is moved toward the front leg when the baby buggy is collapsed as shown in FIGS. 3 and 7. The baby basket is detachably attached to the second frame 15.

As illustrated in FIGS. 4 and 5, two cutout grooves 61, 63 are formed in the first member 51 composing the second frame 15. In this case, positions of the two cutout grooves 61, 63 are determined so that they can be engaged with two protrusions 65, 67 arranged on the lower side of the baby basket 5. There is provided a flange 69 at the end of each protrusion 65, 67 as illustrated in FIG. 5, so that the flange 69 can not be disconnected from the cutout groove in the transverse direction.

One 71 of the connecting members to connect the right frame with the left one of the first frame 11 and the second one 15 can be turned round a shaft, and claws 73 are formed at both ends of this connecting member 71. This connecting member 71 is pushed by a spring not shown in the drawing so that the connecting member 71 can be turned in one direction. The claw 73 is composed in such a manner that a groove 75 is formed on the side of the claw 73 in the pushing direction and the claw 73 is arranged on a position where the groove 75 is engaged with the protrusions 65 and 67. An end 77 of this claw 73 is inclined. When the baby basket 5 is put on the second member 51 so that the protrusion 67 pushes out the claw 73 and fits in the cutout groove 63, the claw 73 is automatically engaged with the cutout groove 63 by the action of a force generated by a spring not shown in the drawing. In this way, the locking function is performed. When the baby basket 5 is detached, it is possible to disconnect the claw 73 from the groove by turning a knob 79 arranged at an end outside the connecting member 71.

As illustrated in FIG. 7, when the baby buggy is collapsed, an angle formed by the front leg 13 and the rear one 25 is reduced. In this case, the first member 51 and the second one 53, which compose the second frame 15, push out their portions connected with the hinge 55. In accordance with the above pushing motion, the first member 51 is also pushed forward. When the baby buggy has been completely collapsed, the entire second frame 15 is moved in the direction of the front leg 13. Due to the foregoing, the baby basket 5 fixed to the second member 15 is also moved toward the front leg. Accordingly, it is possible to prevent the baby basket 5 from interfering with the shopping basket 7 arranged at a position close to the rear leg 25. Accordingly, when the baby buggy is collapsed, the overall height and thickness can be reduced. As a result, the baby buggy can be made compact.

There are provided a pair of armrest members 21, front legs 13, rear legs 25, push rods 9, rotary members 29, connecting members 35, first members 51 composing the second frame 15, and second members 53 also composing the second frame 15, which are arranged symmetrically in the transverse direction. Therefore, the right frame and the left one are arranged substantially symmetrically with each other. The right frame and the left one are connected with each other by a plurality of connecting members 59, 71, 101, 103, 105.

SLIDE TYPE LOCK MECHANISM

In the armrest member, there is provided a lock mechanism 17 (first lock mechanism) which is the same as that of the conventional lock mechanism. When a lever composing this lock mechanism 17 is lifted up, the rotary member 29 can be unlocked. However, when only one lock mechanism 17 is provided, there is a possibility that the lever is mistakenly operated and the lock mechanism is released In order to prevent the above problems, there is provided a second lock mechanism in this embodiment. As the second lock mechanism, there is provided a slide type lock mechanism 19 at the hinge portion of the armrest member 29 and the front leg 13.

There is formed a cavity portion 113 at an end of the base portion 111 fixed to the frame pipe 110 on the front leg 13 side. Into the cavity portion 113, a frame pipe 114 of another armrest member 21 is inserted and connected by means of a hinge pin 115. This hinge pin 115 penetrates a circular hole 115 formed on the side of the frame pipe 114 of the armrest member 21. This hinge pin 115 also penetrates a long hole 119 of the slide member 117 arranged inside the frame pipe 114.

The slide member 117 is pushed by a coil-shaped spring 121 in the direction of the end portion.

The cavity portion 114 into which the slide member 117 is inserted includes: a contact portion 123 to prevent the slide member 117 from turning when the slide member 117 closely comes into contact with a protruding end of the contact portion 123; and an extending portion 125 which is communicated with the contact portion 123, wherein the slide member 117 can be turned when it is withdrawn.

Outside the base portion 111, there is provided a handle 127 capable of sliding along the base portion 111. This sliding motion can be accomplished when a sliding protrusion 129 provided on the base portion 111 side is engaged with a slide groove 131 provided on the handle 127 side. In the handle 127, there is provided a pushing protrusion 133. An end of this pushing protrusion 133 protrudes into the cavity portion 113 via a window 135 provided in the base portion 111, and comes into contact with an end of the slide member 117.

In the process of collapsing motion of the baby buggy, the handle 127 is slid to the right in the drawing, and the pushing protrusion 133 withdraws the slide member 117 to the right in the drawing. Unless the handle 127 is continuously given a force, the slide member 117 is immediately returned to the initial position by the force of the spring 121.

When the handle 127 is lifted up under the condition that the slide member 117 is continuously withdrawn, the slide member 117 is turned at the extending portion 125. Therefore, the front leg 13 is turned round the hinge pin 115, which composes the hinge connecting portion 23, by the weight of the wheel 43 and the front leg 13 itself. In this way, the collapsing motion can be carried out.

When mother lets go of the handle 127 after the baby buggy has been collapsed, the slide member 117 is pushed again by the spring 121 and comes into contact with the contact portion 123 of the cavity portion 113. Therefore, the collapsing state of the baby buggy can be maintained.

Unless the handle 127 is continuously slid and the collapsing motion is continued, it is impossible to actually collapse the baby buggy. Accordingly, even when mother mistakenly puts her hand on the handle 127, there is no possibility that the baby buggy is collapsed. Accordingly, it is possible to realize a very safe lock mechanism. Further, unless both the first lock (the lock mechanism 17) and the second lock (the slide type lock 19) are released, it is impossible to conduct a collapsing motion. Therefore, the safety property can be enhanced.

Second Embodiment

In the first embodiment, the second frame 15 is arranged as a fixing means for fixing the baby basket detachably. However, in another embodiment, the baby basket is not arranged detachably but the baby basket may be fixed at all times. In this case, the second frame 15 is omitted, however, the first frame 11 is substantially the same as that of the embodiment described before.

Referring to FIGS. 9 to 12, this second embodiment will be explained below. In this connection, like reference characters are used to indicate like parts in the views of the first embodiment and the second one, and the explanations are omitted here.

In the second embodiment, the baby basket 141 is always fixed to the connecting member 35 used as a frame of the shopping basket 7. A seat back portion 143, which is provided separately from the baby basket, is attached to a portion of the fixed baby basket 141. This seat back portion 143 is composed in such a manner that a piece of seat back cloth 146 is provided on one frame 145 (shown in FIG. 11) which is formed into a substantial U-shape. A lower end portion of the seat back frame 145 is connected with a portion of the connecting member 35 via metal fittings 147 by means of a hinge 149.

Figure 11:
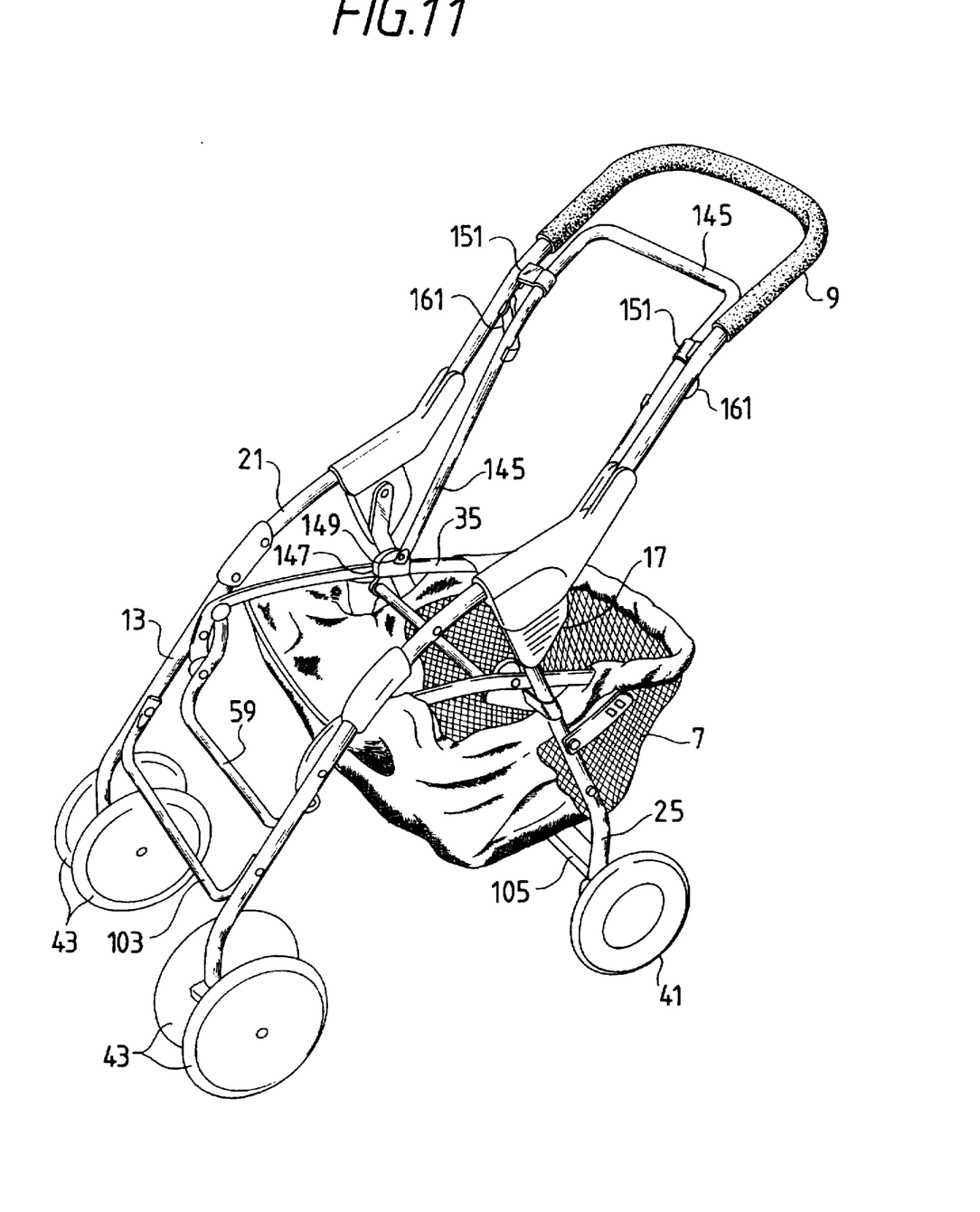
FIG. 11 is an overall perspective view showing the baby buggy illustrated in FIG. 9, from which the baby basket is removed, and only the reclining seat back portion is left.

On the right side and the left one of the seat back frame 145, there are respectively provided tongue-shaped members 151. Each tongue-shaped member 151 is curved into an S-shape. A cylindrical portion of the tongue-shaped member 151 is engaged with a columnar portion of the pipe 155 composing the push rod 9.

A relative positional relation of the rear leg 25 with respect to the push rod 9 in the case where the baby buggy is collapsed is different from that in the case where the baby buggy is developed. Since the seat back frame 145 is connected by means of a hinge 149 with the connecting member 35 located at a position close to the rear leg 25 at all times, a relative positional relation of the seat back frame 145 with respect to the push rod 9 is changed.

As described above, since the relative positional relation of the seat back frame 145 with respect to the push rod 9 is changed, the tongue-shaped members 151 slide along the push rod 9 in the collapsing process of the baby buggy.

Figure 12A:
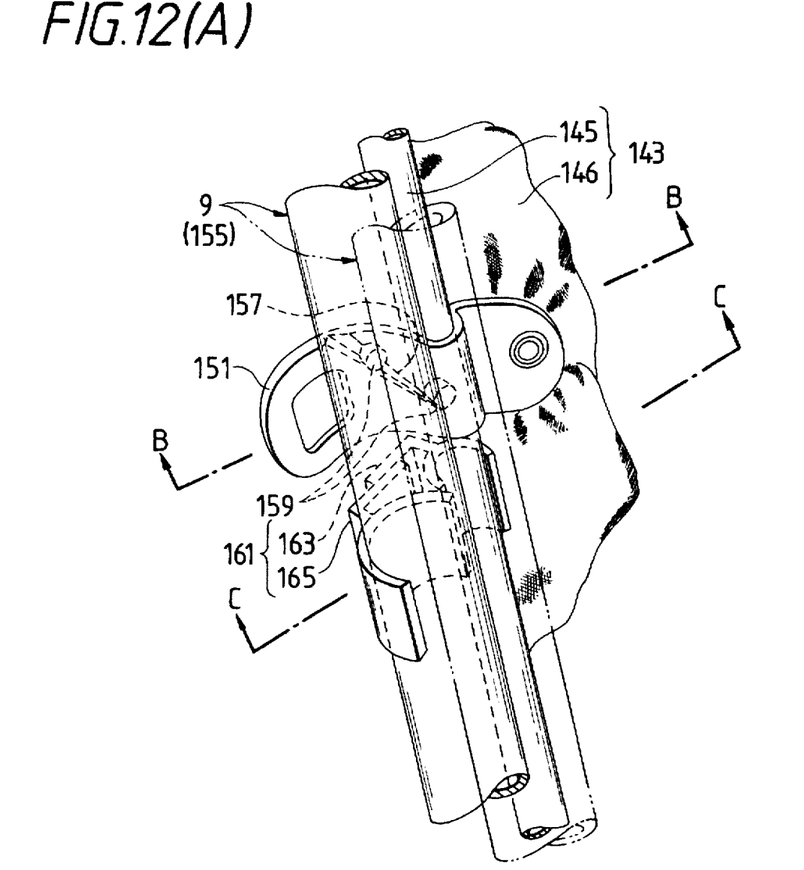
Figure 12B:
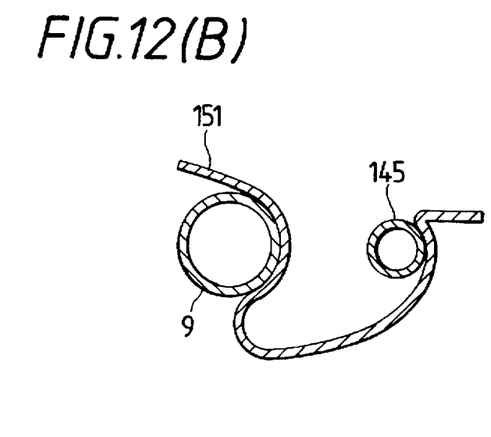
FIG. 12(B) is a cross-sectional view taken on line B—B in FIG. 12(A)
Figure 12C:
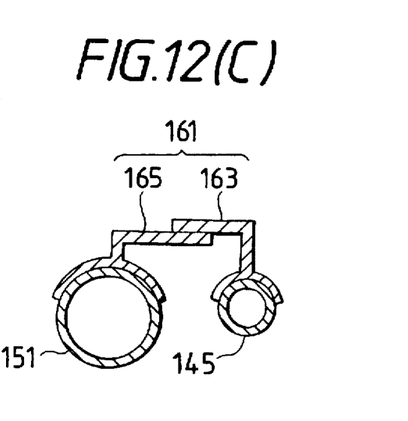
FIG. 12(C) is a cross-sectional view taken on line C—C in FIG. 12(A)

In the tongue-shaped member 151, there is formed a diagonal cutout groove 157. At a position corresponding to this cutout groove 157, in the columnar portion of the pipe 155 composing the push rod 9, there is provided a protrusion 159, the end of which is formed to be semispherical. In the collapsing process of the baby buggy, this protrusion 159 engages with the cutout groove 157, so that a rear side of the cutout groove 157 is pushed by the protrusion 159.

That is, when the collapsing motion proceeds, the protrusion 159 engages with the cutout groove 157 and pushes it. Due to the foregoing, the tongue-shaped member 151 is pushed and disengaged from the columnar portion of the pipe composing the push rod 9. Therefore, the seat back portion 143 is disconnected backward from the framework. In other words, the seat back portion 143 is automatically disconnected and moved backward in the collapsing process of the baby buggy. Due to the foregoing motion of the seat back portion 143, the collapsing motion is not obstructed by the seat back portion 143, and the baby buggy can be collapsed in a compact condition.

There is provided a stopper 161 at a position close to this tongue-shaped member 151, so that the seat back portion 143 can be prevented from unnecessarily moving forward. That is, an engaging portion 163 provided in the seat back frame 145 is engaged with an engaging portion 165 provided in the columnar portion of the pipe 155 composing the push rod 9. When the engaging portion 163 is engaged with the engaging portion 165 in this way, the seat back frame 145 and the pipe 155 can be maintained in a parallel condition. At the same time, when the tongue-shaped member 151 is engaged with the pipe 155 of the push rod 9, the seat back portion 143 can be maintained in a rising condition.

As explained above, according to the present invention, the connecting member is connected with a substantial center of the rotary member by means of a hinge. Therefore, the entire framework composing the seat device can be completely collapsed. Accordingly, it is possible to obtain a compact collapsing condition of the seat device.

According to the present invention, when the connecting member comes into contact with the ground, the seat device can stand alone. Accordingly, it is possible to arrange the wheels at an upper and a lower position when the seat device is collapsed. Therefore, the seat device can be collapsed in a compact condition.

According to the present invention, when the seat device is collapsed, the second frame and the baby basket are moved toward the front leg. Therefore, the seat device can be collapsed in a compact condition.

According to the present invention, when the collapsing motion proceeds, the protrusion engages with the cutout groove. Therefore, the protrusion pushes the cutout groove. Due to the foregoing, the tongue-shaped member is pushed, so that the engagement is released and the seat back is disconnected backward. Therefore, in the process of collapsing the seat device, the seat back portion is automatically disconnected from the framework. Accordingly, the framework of the seat device is not obstructed by the seat back portion in the process of collapsing. Therefore, the seat device can be collapsed in a compact condition.

What is claimed is:

1. a collapsible seat device comprising:
   a frame, said frame including:
      an armrest member;
      a front leg, the upper end of which is connected with a front portion of the armrest member by a hinge;
      a rear leg, the upper end of which is connected with a center of the armrest member with respect to the longitudinal direction or connected with a front portion of the armrest member by a hinge;
      a push rod, the center of which with respect to the upward and downward direction is connected with a rear portion of the armrest member by a hinge;
      a rotary member, the upper end of which is connected with a lower end of the push rod by a hinge, and the lower end of which is connected with the rear leg by a hinge; and
      a connecting member, one end of which is connected with the rotary member by a hinge, and the other end of which is connected with the front leg by a hinge,
   wherein the collapsible seat device is collapsed when the rotary member is turned and located at a lower position, the collapsible seat device is developed when the rotary member is turned and located at an upper position, and one end of the connecting member is connected by means of a hinge with a substantially center portion defined between both hinge connecting portions of the rotary member.

2. A collapsible seat device according to claim 1, wherein the middle of the rotary member is a substantially at the center of the rotary member between the upper and lower ends of the rotary member.

3. A collapsible seat device according to claim 1, wherein the connecting member is extended backward from a portion in which the connecting member is connected with the rotary member by a hinge, the extending length of the connecting member is determined so that the seat device can stand alone when a rear end portion of the connecting member comes into contact with the ground in a collapsed state, and a wheel of the rear leg and a wheel of the front leg are located in the upward and downward direction when the seat device is collapsed.

4. A collapsible seat device according to claim 2, wherein the connecting member is extended backward from a portion in which the connecting member is connected with the rotary member by a hinge, the extending length of the connecting member is determined so that the seat device can stand alone when a rear end portion of the connecting member comes into contact with the ground in a collapsed state, and a wheel of the rear leg and a wheel of the front leg are located in the upward and downward direction when the seat device is collapsed.

5. A collapsible seat device comprising:

a first frame including a front leg and a rear leg, both upper end portions of which are connected with an armrest member by a hinge, the seat device being collapsed when an angle formed between the front leg and the rear one is decreased, and the seat device developed when the angle formed between the front leg and the rear one is increased; and a second frame attached to the first frame, a baby basket being detachably fixed to the second frame, and the second frame being folded so that the baby basket can be moved in the direction of the front leg when the seat device is collapsed.

6. A collapsible seat device according to claim 5, the second frame comprising:

a first member curved downward, one end portion of which is connected with the rear leg by means of a hinge; a second member, one end of which is connected with the other end of the first member by means of a hinge, and the other end of which is connected with the front leg by means of a hinge; and a fixing means for detachably fixing the baby basket attached to the first member.

7. A collapsible seat device in which a relative positional relation between a push rod and a rear leg when the seat device is collapsed is different from a relative positional relation between the push rod and the rear leg when the seat device is developed, said collapsible seat device comprising:

a seat back portion, the lower end portion of which is rotatably connected with the rear leg by means of a hinge;

a cylindrical tongue-shaped member arranged on a side of the seat back portion, the tongue-shaped member engaging with a columnar portion of a pipe composing the push rod so that the tongue-shaped member can slide when the seat device is collapsed;

a cutout groove formed diagonally in the tongue-shaped member; and a protrusion engaging with the cutout groove formed in the columnar portion of the pipe composing the push rod, the protrusion pushing a side at the rear of the cutout groove.

* * * * *